United States Patent
Ohya et al.

(12) 
(10) Patent No.: US 6,207,230 B1
(45) Date of Patent: Mar. 27, 2001

(54) METHOD OF THE PREPARATION OF HIGH-HEAT-RESISTANCE RESIN COMPOSITE CERAMIC

(75) Inventors: Kazuyuki Ohya; Norio Sayama, both of Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/585,420

(22) Filed: Jun. 2, 2000

(30) Foreign Application Priority Data

Jun. 4, 1999 (JP) .................................................. 11-157637

(51) Int. Cl.$^7$ ...................................................... B05D 3/02
(52) U.S. Cl. .......................... 427/227; 264/624; 427/226; 427/228
(58) Field of Search .............................. 264/624; 427/96, 427/226, 227, 228

(56) References Cited

U.S. PATENT DOCUMENTS

| | | | |
|---|---|---|---|
| 4,100,322 | * | 7/1978 | Seibold et al. ........................ 428/257 |
| 4,204,021 | * | 5/1980 | Becker .................................. 428/325 |
| 5,707,567 | * | 1/1998 | Pfaff .................................... 264/29.7 |

* cited by examiner

Primary Examiner—Christopher A. Fiorilla
(74) Attorney, Agent, or Firm—Wenderoth, Lind & Ponack, L.L.P.

(57) ABSTRACT

A method of preparing a high-heat-resistance resin composite ceramic that can be used at a high temperature of over 400° C., the high-heat-resistance composite ceramic exhibiting remarkably high heat resistance, excellent in processability, durability against chemicals and durability against plasma, further, exhibiting "outgassing" to a lesser degree at a high temperature under high vacuum. The method comprises the steps of impregnating an inorganic continuously porous sintered body (I) having an open porosity of at least 0.5% with an organometallic compound (M), heat-treating the impregnated inorganic continuously porous sintered body (I) to decompose the organometallic compound (M) and thereby forming a metal compound which is a carbide, a nitride, an oxide or a composite oxide on an inner wall plane of each of open pores, and filling a heat-resistant silicone resin (R) in the open pores by impregnation under vacuum and thermally curing the heat-resistant silicone resin (R).

4 Claims, No Drawings

METHOD OF THE PREPARATION OF HIGH-HEAT-RESISTANCE RESIN COMPOSITE CERAMIC

FIELD OF THE INVENTION

The present invention relates to a method of preparing a high-heat-resistance resin composite ceramic containing a heat-resistant silicone-containing resin, which high-heat-resistance resin composite ceramic can be used at a high temperature of over 400° C. and can be therefore used as a raw material or auxiliary material for use as a product to be exposed to such a high temperature or for use in the steps of producing electronic parts to be used at such a high temperature.

PRIOR ART OF THE INVENTION

Ceramics have excellent properties such as a low heat expansion coefficient, a high heat-radiating property, electric insulation, and the like. These excellent physical properties are relied upon to commercialize various products such as a printed wiring board, and the like.

Since, however, ceramics are generally poor in processability, it is required to employ special machines and equipment and high processing techniques for applying them to desired products such as parts, so the products are expensive and are therefore limited in use.

For compensating the above defects with machinability, machinable ceramics have been developed. However, the machinable ceramics are fragile, and the machinability of these ceramics is limited. Further, the machinable ceramics are prepared by compositing and have pores, which results in a defect that they show a large change in physical properties due to moisture absorption, and the like.

A C/C carbon composite is excellent in heat resistance and thermal expansion coefficient and is also excellent in processability. However, the defect with it is that it shows large water absorption when used alone, and that it is liable to cause carbon dust. While an amorphous carbon and a glassy carbon are considerably improved in these properties, these are not yet satisfactory in improvements.

The present inventors completed a method of preparing a substrate, in which the above defects such as water absorption can be overcome and a substrate having high thickness accuracy can be obtained by preparing a novel resin-impregnated ceramic improved in machiability and impart with impact resistance and cutting the ceramic (JP-A-5-291706, etc.). Further, as a result of further studies, there was completed a metal-foil-clad resin composite ceramic substrate obtained by bonding a metal foil to a resin-impregnated and -cured composite ceramic layer (JP-A-8-244163).

The above resin composite ceramic substrate has a low water absorption ratio and excellent durability against water and chemicals, and in these points, the resin composite ceramic overcomes all the defects of ceramics. However, the upper limit temperature of the heat durability thereof depends upon the heat resistance of a resin used, and those resins disclosed in the above prior techniques are greatly limited in use at a temperature of over 400° C. There is a limitation to be imposed on the use of the above substrate when it is exposed to a temperature of over 400° C.

SUMMARY OF THE INVENTION

It is an object of the present invention to provide a method of preparing a high-heat-resistance resin composite ceramic which has a low water absorption ratio and has excellent durability against water and chemicals and which shows excellent heat resistance.

It is another object of the present invention to provide a method of preparing a high-heat-resistance resin composite ceramic which has excellent durability against plasma and which exhibits "outgassing" to a less degree at a high temperature under high vacuum.

That is, according to the present invention, there is provided a method of preparing a high-heat-resistance resin composite ceramic, comprising the steps of impregnating an inorganic continuously porous sintered body (I) having an open porosity of at least 0.5% with an organometallic compound (M), heat-treating the impregnated inorganic continuously porous sintered body (I) to decompose the organometallic compound (M) and thereby forming a metal compound which is a carbide, a nitride, an oxide or a composite oxide on an inner wall plane of each of open pores, and filling a heat-resistant silicone resin (R) in the open pores by impregnation under vacuum and thermally curing the heat-resistant silicone resin (R).

DETAILED DESCRIPTION OF THE INVENTION

In the present invention, the inorganic continuously porous sintered body (I) preferably has an open porosity of 2 to 35% and an average pore diameter in the range of from 0.1 to 10 μm. The inorganic continuously porous sintered body (I) is preferably selected from an aluminum nitride-boron nitride composite sintered body (AlN-h-BN), a silicon nitride-boron nitride sintered body ($Si_3N_4$-h-BN), a sintered body of a β-silicon carbide porous material (β-SiC) or a sintered body of a material shaped from carbon (C). The above inorganic continuously porous sintered body (I) is impregnated with an organometallic compound (M), and the impregnated inorganic continuously porous sintered body (I) is heat-treated preferably by treating it at a temperature equivalent to, or lower than, 300° C. in a preliminary treatment and then treating it at a maximum temperature of 850° C. or lower to decompose the organometallic compound (M). The organometallic compound (M) is preferably selected from an organometallic compound containing aluminum, titanium or silicon or an organometallic compound which is a prepolymer having a weight average molecular weight of less than 10,000.

The constitution of the present invention will be explained hereinafter.

The inorganic continuously porous sintered body (I) used in the present invention is a ceramic or a carbon having continuous pores and having the form of a flat plate, a disk, a cube, a rectangular parallelepiped, a cylinder or other. The inorganic continuously porous sintered body (I) preferably includes sintered bodies of an aluminum nitride-boron nitride composite material (AlN-h-BN), a silicon nitride-boron nitride composite material ($Si_3N_4$-h-BN), a β-silicon carbide porous material (β-SiC), titanated aluminum (TiN) and a shaped material of carbon (C). The shaped material of carbon (C) includes C/C carbon composite and others such as amorphous carbon and glassy carbon.

The heat-resistant silicone resin (R) used in the present invention can be any silicone resin so long as it can be easily viscosity-decreased in a state where it contains a solid content (resin content) to some extent. That is, even a silicone resin mostly equivalent to an oligomer can be used. Specifically, the heat-resistant silicone resin (R) includes a ladder silicone resin (polyorganosiloxane), polysilazane, polyimdesiloxane and polyorganosilsesquioxane-cyanate resin.

Of these, a ladder silicone resin is preferred. The ladder silicone resin includes one having methyl and phenyl groups as side chains, one having methyl groups alone as side chains and one having phenyl groups alone as side chains, and all of these ladder silicone resins have high heat resistance. The formula (1) to be described later shows a ladder silicone resin having methyl and phenyl groups as side chains.

For impregnating the inorganic continuously porous sintered body (I) with the heat-resistant silicone resin (R), it is required to improve the affinity between these two members. The affinity can be improved by impregnating open pores of the inorganic continuously porous sintered body (I) with an organometallic compound (M) which is an aluminum-, titanium- or silicon-containing compound or a prepolymer having a weight average molecular weight of less than 10,000, and pyrolyzing the organometallic compound to form a metallic compound which is an oxide or a composite oxide on an inner surface plane of each open pores.

The organometallic compound (M) includes aluminum chelates such as aluminum isopropylate, aluminum ethylate, aluminum sec-butylate, aluminum mono-sect-butoxydiisopropylate, aluminum isopropoxide, ethylacetoacetatealuminum diisopropylate, aluminum tris (ethylacetoacetate), and aluminum monoacetylacetonate-bis (ethylacetoacetate) and aluminum tris(acetylacetonate) (aluminum-acetylacetone), cyclic aluminum compound oligomers such as cyclic aluminum oxide octylate, cyclic aluminum oxide stearate and cyclic aluminumoxide isopropylate.

Further, the organometallic compound (M) includes titanium-containing organometallic compounds such as tetraisopropoxytitanium, tetra-n-butoxytitanium, tetrakis-(2-ethylhexyloxy)titanium, tetra-stearyloxytitanium, diisopropoxy-bis(acetylacetone)titanium, di-n-butoxy-bis(triethanolaminato)titanium, titanium-isopropoxyoctylene glycolate, titanium stearate, tri-n-butoxytitanium monostearate and titanium acetylacetone, and silicon-containing organometallic compounds such as γ-glycidoxypropyltrimethoxysilane, γ-aminopropyltriethoxysilane, methyltrimethoxysilane, methyltriethoxysilane, hexamethyldisilane, trimethylisocyanate, dimethylsilyldiisocyanate, methylsilytriisocyanate, vinylsilylisocyanate, phenylsilyltriisocyanate and tetraisocyanatesilane, ethoxysilanetriisocyanate.

The prepolymer having a weight average molecular weight of less than 10,000 includes ceramic precursor organometallic compounds such as polysilazane, polycarbodisilane, polyaluminoxane, polyborosiloxane, polysiloxane, polysilastyrene, polycarboranesiloxane, oligomers of ladder polymers of polysilicones, polytitanocarbosilane, heptamethylvinyltrisilane, polyborodiphenylsiloxane and boronylpyridine.

In general, the inorganic continuously porous sintered body (I) is impregnated with the above organometallic compound (M) as follows. A solution of the compound (M) is prepared, and the inorganic continuously porous sintered body (I) is impregnated with the solution under vacuum, and the solvent is removed by air drying and heat-drying. Then, generally, the inorganic continuously porous sintered body (I) impregnated with the metal (M) is heated at a temperature of 300° C. or lower, whereby a residual solvent is removed completely, and the compound is imparted with more affinity to, and fixed to, the surface of inner wall plane of each open pore through melting, polymerization and preliminary decomposition of the compound (M).

Then, the inorganic continuously porous sintered body (I) impregnated with the compound (M) fixed therein is heated up to a predetermined pyrolysis temperature not exceeding 850° C., to pyrolyze the compound (M), whereby a metal compound which is a carbide, an oxide or a composite oxide is formed on the inner plane surface of each open pores. When the pyrolysis is carried out in air, an oxide or a composite oxide is mainly formed. When the pyrolysis is carried out in a nitrogen gas atmosphere, a carbide is formed, and a nitride is also formed in some cases.

When the metal compound (M) is not pyrolyzed, the inorganic continuously porous sintered body (I) shows poor affinity to the heat-resistant silicone resin, or it cannot be impregnated with the heat-resistant silicone resin in some cases.

Further, when the pyrolysis temperature is as high as approximately 900° C. in air, the metal compound (M) is converted to a metal oxide having of which the crystallization is promoted, i.e., a substance which can be clearly identified as a ceramic, and in many cases, the affinity to the heat-resistant silicone resin to be used for the impregnation cannot be improved.

Then, the thus-obtained inorganic continuously porous sintered body (I) having the affinity of the inner wall plane of each open pore to the heat-resistant silicone resin improved is impregnated with the heat-resistant silicone resin (R), and press-molded under heat to obtain a high-heat-resistance silicone resin composite ceramic of the present invention.

The impregnation method is selected appropriately depending upon the resin used for the impregnation.

When the ladder silicone resin suitable as a heat-resistant silicone resin (R) is heat-melted alone, generally, it has a high viscosity so that the impregnation therewith is difficult in many cases. In such a case, preferably, the ladder silicone resin is dissolved in an organic solvent such as toluene, xylene or the like, and after the steps of impregnation, drying and preliminary polymerization using such a solution are repeated a plurality of times as required, the inorganic continuously porous sintered body (I) impregnated with the ladder silicone resin is press-molded in an atmosphere under reduced pressure to produce the high-heat-resistance silicon resin composite ceramic. When the above solution impregnation method is used, a heat-resistant thermoplastic resin such as polyimide may be used in combination with the heat-resistant silicone resin such as the ladder silicone resin.

In another embodiment, a thermosetting resin monomer compatible with the ladder silicone resin (polyorganosilsesquioxane) is added to, and mixed with, the ladder silicon resin, and a low-viscosity melt is prepared at a temperature at which the added thermosetting resin monomer does not substantially react. In this case, the inorganic continuously porous sintered body (I) can be impregnated with a solventless composition. The thermosetting resin monomer having the above property includes cyanate resin monomers typified by 2,2-bis(4-cyanatephenyl)propane, bis (4-maliemidephenyl)methane and bisallyldiimide resin. When 2,2-bis(4-cyanatephenyl)propane is used, the amount thereof based on the ladder silicone resin is at least 5% by weight, preferably 10 to 30% by weight. When 2,2-bis(4-cyanatephenyl)propane is added in such an amount, a melt that can be used for the impregnation can be prepared, and a decrease in heat resistance can be reduced.

The press-molding under heat is carried out according to curing conditions depending upon the resin used.

When the inorganic continuously porous sintered body (I) is impregnated with the above ladder silicone resin (polyorganosilsesquioxane) alone, the ladder silicone resin is cured by press-molding under heat in an atmosphere under reduced pressure. In the above press-molding, the pressure is at least 0.1 MPa, preferably 0.3 to 5 MPa, and the temperature as a maximum temperature is preferably 200 to 400° C. The temperature as a final curing temperature is required to be approximately at least 300° C. but 400° C. or lower. However, there may be employed constitution in which the press-molding is carried out at a temperature lower than the above, i.e., a temperature up to approximately 250° C. and post-curing is carried out at 300 to 400° C.

The thus-prepared high-heat-resistance resin composite ceramic of the present invention exhibits remarkably high heat resistance and high chemical resistance, has excellent durability against plasma, and exhibits "outgassing" to a less degree at a high temperature under high vacuum. Further, it has excellent processability as a resin composite ceramic or carbon, so that it can be polished, cut and machined as required for using it in various fields of use.

Specifically, the above fields of use include a dummy wafer in the step of producing a semiconductor, a nozzle (fine openings 60 to 100 μm) of a plasma CVD system, a plasma-etching support, an ion-plating support, a socket and a substrate for a semiconductor acceleration (heated) test, and the like.

EXAMPLES

The present invention will be more specifically explained with reference to Examples and Comparative Example. In Examples, etc., "%" or "percent" stands for "% by weight" unless otherwise specified.

Example 1

Five percent of aluminum tris(ethylacetylacetonate) (trade name: ALCH-TR, supplied by Kawaken Fine Chemicals K.K.), 30%) of mixed xylene and 65% of isopropyl alcohol were mixed, to prepare a solution (to be referred to as "Solution S1" hereinafter) for treating inner wall surfaces of open pores.

As an inorganic continuously porous sintered body, there was provided an aluminum nitride-boron nitride porous sintered body having a thickness of 1.2 mm and a diameter of 150 mm (h-BN content 13%, a bulk density 2.70 g/cm$^3$, a true porosity 13.0 vol %, an average pore diameter 0.48 μm, to be referred to as "AN1" hereinafter).

AN1 was placed in a container, the container was set in a vacuum impregnator, and Solution S1 was poured into the container. Then, vacuum impregnation was carried out at room temperature (25° C.) for 30 minutes, and then the AN1 impregnated with Solution S1 was taken out.

The impregnated AN1 was placed in a dryer, and dried by increasing a temperature stepwise in the course of 120° C./60 minutes+180° C./30 minutes+250° C./30 minutes. The AN1 was taken out, placed on a plate made of aluminum, and the plate with the AN1 on it was placed in a muffle furnace, temperature-increased from 250° C. to 750° C. at a temperature elevation rate of 8° C./minute and maintained at 750° C. for 1 hour, to obtain the AN1 having an aluminum oxide generated in open pores (to be referred to as "AN-T1" hereinafter).

Sixty percent of a ladder type silicon oligomer (trade name: Glass Resin G-908, supplied by Owns-Illinois, polyorganosilsesquioxane, side-chain methyl groups/phenyl groups=1/4, represented by the following formula) and 40% of a mixing xylene solvent were mixed, to prepare a thermosetting resin composition (to be referred to as "Resin R1" hereinafter).

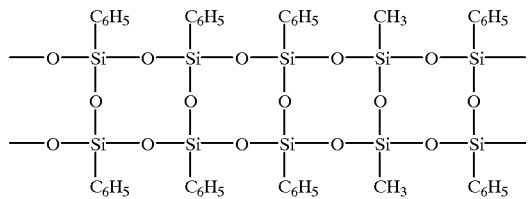

The above-obtained AN-T1 was placed in a container, and the container with the AN-T1 in it was placed in a pressure-reducible impregnation system. The above resin R1 was placed in a resin container in the impregnation system, and the internal pressure of the impregnation system was reduced to 0.665 kPa and maintained for 5 minutes at room temperature. Then, the resin R1 was gradually poured into the container with the AN-T1 in it through a bottom of the resin container at 20° C., and vacuum impregnation was carried out for 3 hours.

The AN-T1 impregnated with Resin R1 was taken out of the pressure-reducible impregnation system, a surface resin was removed by dropping it, and the AN-T1 was air-dried for 16 hours. Further, the AN-T1 was dried stepwise by increasing a temperature with a hot air dryer in the course of 120° C./15 minutes+150° C./15 minutes+180° C./15 minutes+250° C./30 minutes, and cooled to room temperature. Then, the steps of the above vacuum impregnation and the above stepwise drying were repeated twice (three times as a total) except that the vacuum impregnation time was changed to 12 hours each, to give a resin-impregnated AN-T1 (to be referred to as "R-AN-T1" hereinafter).

The above R-AN-T1 was interposed between two heat-resistant aluminum alloy sheets having Teflon-treated surfaces each and having a thickness of 0.4 mm each, and the so-prepared set was placed between hot press plates. Then, the hot press plates were moved until they came in contact with the set without causing any pressure on it. in this state, the pressure reduction was initiated, and then, the heating with the hot press plates was initiated.

When the R1-AN-T1 reached a temperature of 150° C., the pressurization with the hot press plates was initiated, and while a surface pressure was maintained at 0.3 MPa (≅3 kg/cm$^2$), the R1-AN-T1 was heated up to 350° C. at a temperature elevation rate of 6° C./minute and maintained at 350° C. for 1 hour. Then, the heating was terminated, and the R1-AN-T1 was allowed to cool to give a resin composite ceramic plate (to be referred to as "CR1-AN-T1" hereinafter).

Further, the obtained CR1-AN1-T was surface-lapped with a No. 1000 SiC grinder grains to give a resin composite ceramic plate (to Fe referred to as "CR1-AN-T1/#1000" hereinafter).

The thus-obtained CR1-AN-T1/#1000 was tested with regard to the generation of gas at a high temperature under vacuum and discoloration, etc., under heat in air. Tables 1 and 2 show the results.

Comparative Example 1

87 Percent of a cyanate ester-maleimide resin (trade name: BT-2000, 2,2-bis(4-maleimidepheny)propane/bis(4- meleimidephenyl)methane=9/1), 10% of a bisphenol A type epoxy resin (trade name: Epikote 152, epoxy equivalent 172–179, supplied by Yuka-Shell Epoxy K.K.) and 3% of γ-glycidoxypropyltrimethoxysilane were mixed, to obtain a thermosetting resin composition (to be referred to as "Resin RC" hereinafter).

AN-T1 obtained in the same manner as in Example 1 was placed in a container, the container with the AN-T1 in it was set in a pressure-reducible impregnation system, and the internal pressure of the system was reduced to 0.6 kPa. Then, the temperature in the system was increased up to 110° C. and the temperature of 100° C. was maintained for 1 hour. Further, the above-prepared Resin RC was placed in a resin container in the pressure-reducible impregnation system, melted at 110° C. and degassed undere reduced pressure for 10 minutes.

While the reduced pressure was maintained, the Resin RC in the resin container was gradually poured into the container with the AN-T1 in it through a bottom portion of the resin container at 110° C., and impregnation was carried out for 1 hour.

The AN-T1 impregnated with Resin RC was taken out, surface region was removed by dropping it, and the Resin RC was cured to give a resin-impregnated porous material (to be referred to as "RC-AN-T1" hereinafter).

The above RC-AN-T1 was interposed between low-profile profile electrolytic copper foils having a thickness of 31 μm each, and the resultant laminate was sandwiched between 0.38 μm thick aluminum plates. The so-prepared set was interposed between hot press plates, and the hot press plates were heated and the at the same time the pressure reduction inside the impregnation system was initiated. A pressure of 0.6 MPa was applied at a temperature of 80° C., and at 135° C., the pressure reduction was terminated, and a pressure of 1 MPa was applied. In this state, the temperature was increased up to 190° C., and press-molding was carried out for 3 hours, followed by natural cooling, to give a copper-clad composite ceramic plate (to be referred to as "CRC-AN-T1" hereinafter). Incidentally, the time period from the initiation of the pressure reduction to the application of a pressure of 0.6 MPA was 10 minutes long, and the time period before the termination of the pressure reduction was 20 minutes long.

The thus-obtained CRC-AN-T1 was tested with regard to the generation of gas at a high temperature under vacuum and discoloration, etc., under heat in air. Tables 1 and 2 show the results.

Example 2

80 Percent of the same Glass Resin as that used in Example 1 and 20% of 2,2-bis(4-cyanatephenyl)propane were mixed to prepare a thermosetting resin composition (to be referred to as "Resin R2" hereinafter).

AN-T1 obtained in the same manner as in Example 1 was placed in a container, the container with the AN-T1 in it was placed in a pressure-reducible impregnation system, and the pressure in the system was reduced to 0.6 kPa. The temperature in the system was increased to 120° C., and the temperature of 120° C. was maintained for 30 minutes.

Further, the above-prepared Resin R2 was placed in a resin container in the pressure-reducible impregnation system, melted at 120° C. and degassed under reduced pressure for 10 minutes.

While the above reduced pressure was maintained, the above Resin R2 was gradually poured into the container with the AN-T1 in it through a bottom portion of the resin container at 120° C., and vacuum impregnation was carried out for 30 minutes.

The AN-T1 impregnated with Resin R2 was taken out of the pressure-reducible impregnation system, surface resin was removed by dropping it, and at the same time, the Resin R2 was cured to give a resin-impregnated porous material (to be referred to as "R2-AN-T1" hereinafter).

The above R2-AN-T1 was interposed between two heat-resistant aluminum alloy sheets having Teflon-treated surfaces each and having a thickness of 0.4 mm each, and the so-prepared set was placed between hot press plates. Then, in a state where the hot press plates were in contact with the set almost without causing any pressure on it, the pressure reduction was initiated, and then, the hot press plates were heated. When the R2-AN-T1 reached a temperature of 80° C., the pressurization was initiated, and while a surface pressure was maintained at 0.3 MPa, the R2-AN-T1 was heated up to 230° C. at a temperature elevation rate of 6° C./minute and press-molded at 230° C. for 1 hour. The press-molded R2-AN-T1 was taken out of a press machine, and the Resin R2 was post-cured under the flow of nitrogen at 300° C. for 1 hour and the R2-AN-T1 was allowed to cool to give a resin composite ceramic plate (to be referred to as "CR2-AN-T1" hereinafter) . Further, the obtained CR2-AN1-T was surface-lapped in the same manner as in Example 1 to give a resin composite ceramic plate (to be referred to as "CR2-AN-T1/#1000" hereinafter). The thus-obtained CR2-AN-T1/#1000 was tested with regard to the generation of gas at a high temperature under heat under vacuum. Table 1 shows the result.

Example 3

Three percent of (2-n-butoxycarbonylbenzoyloxy)-tributoxytitanium (trade name: Titacoat S-181, supplied by Nippon Soda K.K.) and 97% of toluene were mixed to prepare a treating solution (to be referred to as "Solution S2" hereinafter).

There was provided an amorphous carbon board having a thickness of 4.0 mm and a diameter of 40 mm (bulk density 1.58 g/cm$^3$, true porosity 1.8 vol %, average pore diameter 0.28 μm, to be referred to as "CN1" hereinafter).

The CN1 was placed in a container, and the container with the CN1 in it was placed in a vacuum dryer. The Solution S2 was poured into the container, the CN1 was maintained at room temperature of 25° C. for 30 minutes, to carry out vacuum impregnation, and the impregnated CN1 was taken out.

The above impregnated CN1 was placed in a dryer, and dried by increasing a temperature stepwise in the course of 120° C./60 minutes+180° C./30 minutes and 250° C./30 minutes. Further, the CN1 was taken out, placed on a plate made of alumina, and the plate with the CN1 on it was placed in a muffle furnace. The CN1 was temperature-increased from 250° C. to 600° C. at a temperature elevation rate of 8° C./minute, maintained at 600° C. for 1 hour and then cooled to give a carbon-fiber-reinforced carbon composite material having a titanium oxide generated on inner surfaces of pores (to be referred to as "CN-T2" hereinafter).

CN-T2 impregnated with Resin R1 (to be referred to as "R1-CN-T2" hereinafter) was obtained in the same manner as in Example 1 except that the above-obtained CN-T2 was used.

The above R1-CN-T2 was press-molded and lapped in the same manner as in Example 1, to give a resin composite ceramic plate excellent in surface roughness (to be referred to as "CR1-CN-T2/#1000" hereinafter).

The thus-obtained CR1-CN-T1/#1000 was tested with regard to the generation of gas at a high temperature under heat under vacuum. Table 1 shows the result.

Example 4

There was provided a C/C carbon composite (supplied by K.K. Across, open porosity 17 vol %, density 1.9 g/cm$^3$, flexural strength 42 kg/mm$^2$, to be referred to as "C/C" hereinafter), and a resin composite ceramic plate excellent in surface roughness (to be referred to as "CR1-C/C-T2/#1000" hereinafter) was obtained by carrying out treatment of inner surfaces of open pores, impregnation with a resin, press molding and lapping in the same manner as in Example 3 except that the amorphous carbon plate (CN1) was replaced with the above C/C carbon compoiste. The thus-obtained CR1-C/C-T2/#1000 was tested with regard to the generation of gas at a high temperature under heat under vacuum. Table 1 shows the result.

TABLE 1

Generation of gas under heat under vacuum

| | 350° C. | 400° C. | 450° C. | 500° C. | 550° C. |
|---|---|---|---|---|---|
| Ex. 1 | No | No | No | No | Yes A1 |
| CEx. 1 | No | Yes A1 | Yes A2 | — | — |
| Ex. 2 | No | No | No | Yes A1 | Yes A2 |
| Ex. 3 | No | No | No | No | Yes A1 |
| Ex. 4 | No | No | No | No | Yes A1 |

Ex. = Example, ECx. = Comparative Example
Generated gasses
Yes A1: $H_2$, $H_2O$, CO, $CO_2$
Yes A2: $H_2$, NO, $NO_2$, CO, $CO_2$

TABLE 2

Discoloration, etc., under heat in air

| | 300° C. | 350° C. | 400° C. | 450° C. | 500° C. | 550° C. |
|---|---|---|---|---|---|---|
| Ex. 1 | No | No | No | No | Slightly colored | Brown |
| CEx. 1 | No | No | Darkish brown | Black | Swelling | — |

Ex. = Example, CEx. = Comparative Example

As the above Examples and Comparative Example clearly show, the high-heat-resistance resin composite ceramic of the present invention exhibits remarkably high heat resistance, and it is excellent in processability, durability against chemicals and durability against plasma. It further exhibits "outgassing" to a less degree at a high temperature under high vacuum. The high-heat-resistance resin composite ceramic of the present invention is therefore remarkably significant as a novel material.

What is claimed is:

1. A method of preparing a high-heat-resistance resin composite ceramic, comprising the steps of impregnating an inorganic continuously porous sintered body (I) having an open porosity of at least 0.5% with an organometallic compound (M), heat-treating the impregnated inorganic continuously porous sintered body (I) to decompose the organometallic compound (M) and thereby form a metal compound which is a carbide, a nitride, an oxide or a composite oxide on an inner wall plane of each open pore, and filling a heat-resistant silicone resin (R) in each open pore by impregnation under vacuum and thermally curing the heat-resistant silicone resin (R).

2. The method according to claim 1, wherein the inorganic continuously porous sintered body (I) is selected from the group consisting of an aluminum nitride-boron nitride composite sintered body (AlN-h-BN), a silicon nitride-boron nitride sintered body ($Si_3N_4$-h-BN), a sintered body of a β-silicon carbide porous material (β-SiC) and a sintered body of a material shaped from carbon (C), which have an open porosity of 2 to 35% and an average pore diameter in the range of from 0.1 to 10 $\mu$m.

3. The method according to claim 1, wherein the heat-treatment is carried out by treating the impregnated inorganic continuously porous sintered body (I) at a temperature equivalent to, or lower than, 300° C. in a preliminary treatment and then treating it at a maximum temperature of 850° C. or lower to decompose the organometallic compound (M).

4. The method according to claim 1, wherein the organometallic compound (M) is selected from an organometallic compound containing aluminum, titanium or silicon or an organometallic compound which is a prepolymer having a weight average molecular weight of less than 10,000.

* * * * *